United States Patent [19]

Agrimis

[11] Patent Number: 5,471,746

[45] Date of Patent: Dec. 5, 1995

[54] VEGETABLE/FRUIT PEELER AND METHOD OF USE

[76] Inventor: Elizabeth Agrimis, 2 Heritage Woods, Wallingford, Conn. 06492

[21] Appl. No.: 308,273

[22] Filed: Sep. 19, 1994

[51] Int. Cl.⁶ .................................................. B26B 11/00
[52] U.S. Cl. ........................................ 30/123.5; 30/279.6
[58] Field of Search .............................. 30/123.5–123.7, 30/279.6, 340; 178/300, 310–312, DIG. 2, DIG. 4

[56] References Cited

U.S. PATENT DOCUMENTS 1,714,413  5/1929  Woodward et al. .................... 30/279.6
5,251,377  10/1993  Ho ........................................ 30/123.5

*Primary Examiner*—Douglas Watts
*Attorney, Agent, or Firm*—John H. Crozier

[57] ABSTRACT

In a preferred embodiment, a vegetable/fruit peeler, including: a body portion having a cavity defined therein; a cover plate closing a portion of the cavity; and an exposed knife edge extending through an opening defined in the cover plate, the knife edge being generally parallely spaced closely to and surrounded by a relatively large flat surface of the cover plate; whereby, when a vegetable or fruit is placed against the relatively large flat surface and against the knife edge, and the knife edge advanced under skin of the vegetable or fruit, the knife edge will remove peels of the skin from the vegetable or fruit which peels will enter the cavity.

10 Claims, 4 Drawing Sheets

5,471,746

VEGETABLE/FRUIT PEELER AND METHOD OF USE

BACKGROUND OF THE INVENTION

1. Field of the Invention

The present invention relates to kitchen implements generally and, more particularly, but not by way of limitation, to a novel vegetable/fruit peeler and method which are simple and safe to use.

2. Background Art

There are a number of implements for peeling vegetables and fruits. One often used implement is simply a small knife which a person grasps in one hand while drawing the blade under the skin of a vegetable or fruit held in the other hand. While this can be satisfactory, the unprotected blade is a frequent source of cuts.

A very common implement for peeling vegetables and fruits is a handle having a cutting end extending axially therefrom, the cutting end comprising, in cross-section, an arcuate channel open at the bottom, with opposed cutting surfaces formed along the edges of the opening. Typically, in use, a person holds a vegetable or fruit in one hand while the other hand makes fairly rapid slicing cuts along the surface of the vegetable or fruit. This is somewhat safer than a simple knife, but still results in frequent cuts of the fingertips and knuckles of the hand holding the vegetable or fruit.

Accordingly, it is a principal object of the present invention to provide a vegetable/fruit peeler and method of use that are relatively safe.

It is a further object of the invention to provide such a vegetable/fruit peeler and method of use that are convenient.

It is an additional object of the invention to provide such a vegetable/fruit peeler that is economically constructed.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a vegetable/fruit peeler, comprising: a body portion having a cavity defined therein; a cover plate closing a portion of said cavity; and an exposed knife edge extending through an opening defined in said cover plate, said knife edge being generally parallely spaced closely to and surrounded by a relatively large flat surface of said cover plate; whereby, when a vegetable or fruit is placed against said relatively large flat surface and against said knife edge, and said knife edge advanced under skin of said vegetable or fruit, said knife edge will remove peels of said skin from said vegetable or fruit which peels will enter said cavity.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Figure 1:
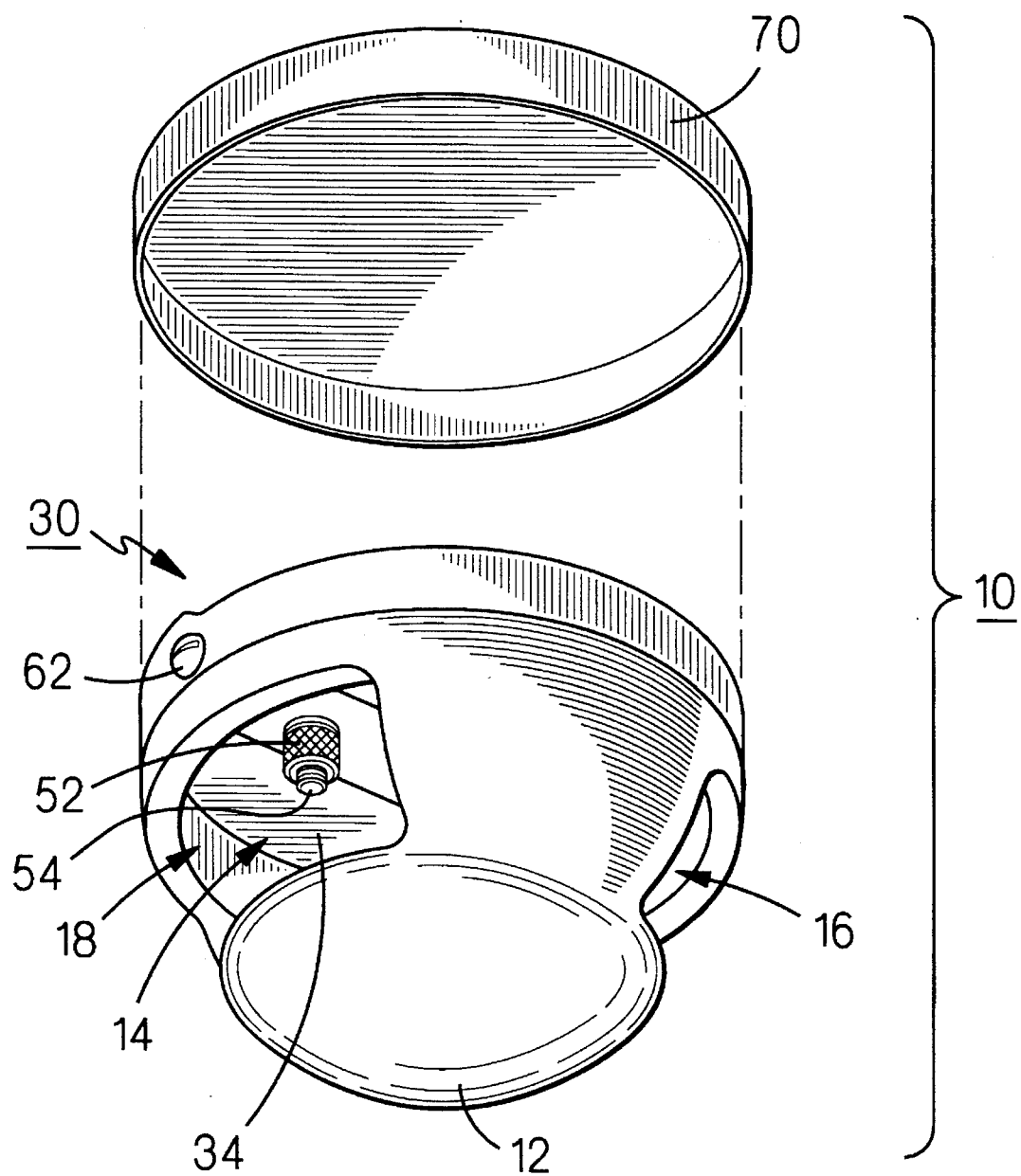
FIG. 1 is an isometric view of a vegetable/fruit peeler, according to the present invention, with a protective lid spaced apart therefrom.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

Referring to FIGS. 1–5 together, there is illustrated a vegetable/fruit peeler, generally indicated by the reference numeral 10, constructed according to the present invention.

Peeler 10 includes a body portion 12 which is of a substantially hollow, generally hemispheroidal shape and defining an internal cavity 14. Body portion 12 is sized so as to be conveniently gripped in a hand of a user. Openings 16 and 18 (FIG. 4) are defined through opposite sides of body portion 12 for communication between cavity 14 and the surrounding environment.

Figure 2:
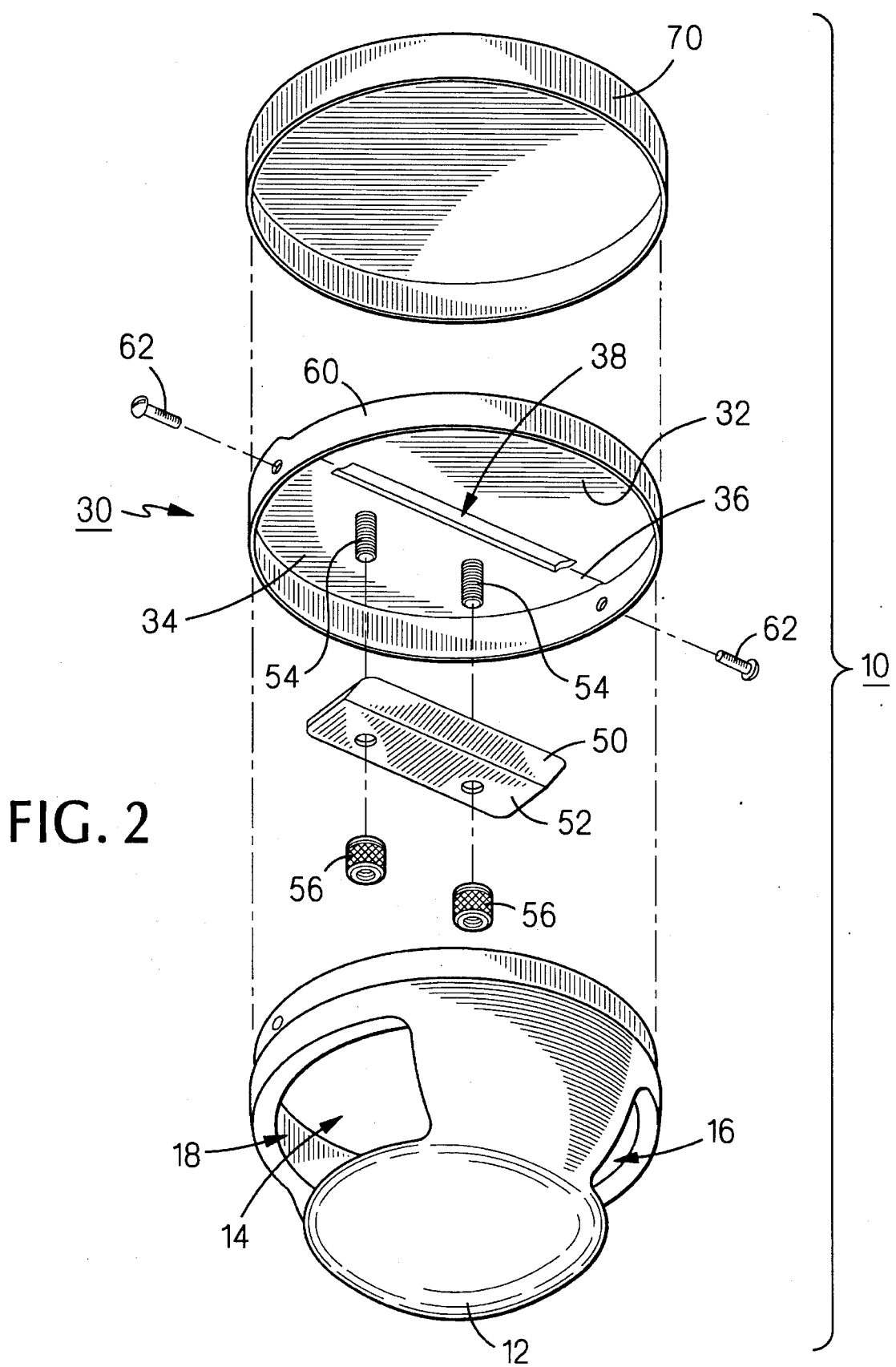
FIG. 2 is an exploded isometric view of the vegetable/fruit peeler with lid.
Figure 3:
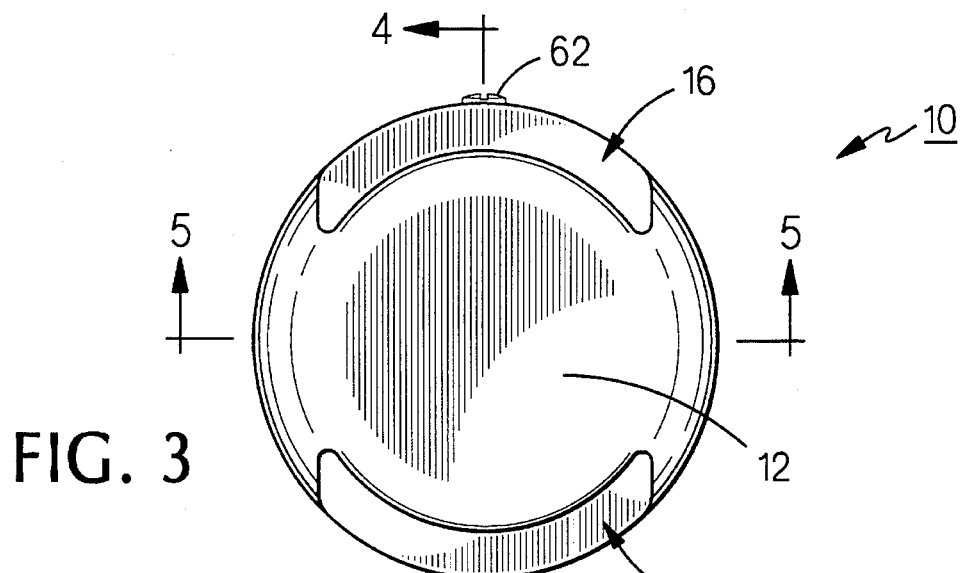
FIG. 3 is a bottom plan view of the vegetable/fruit peeler.
Figure 4:
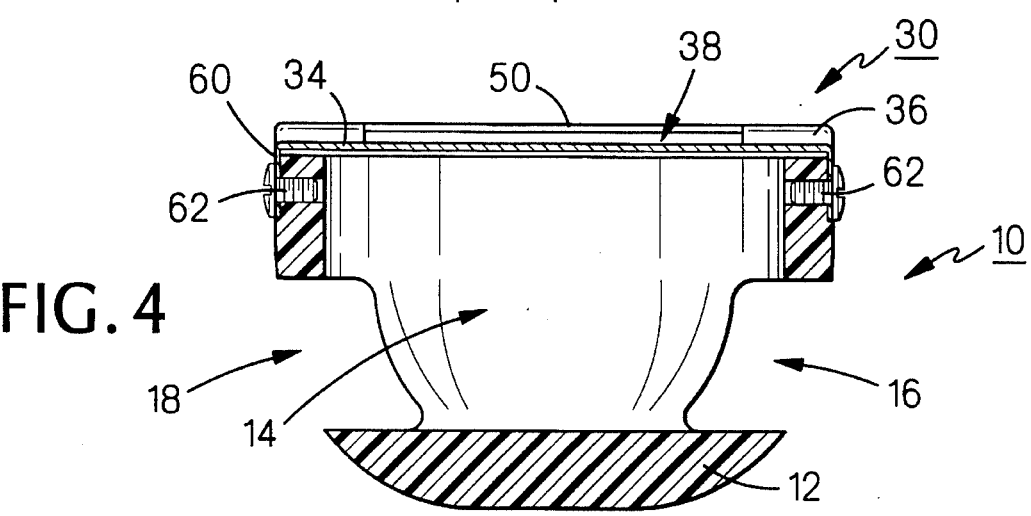
FIG. 4 is a cross-sectional view of the vegetable/fruit peeler taken along line "4—4" of FIG. 3.
Figure 5:
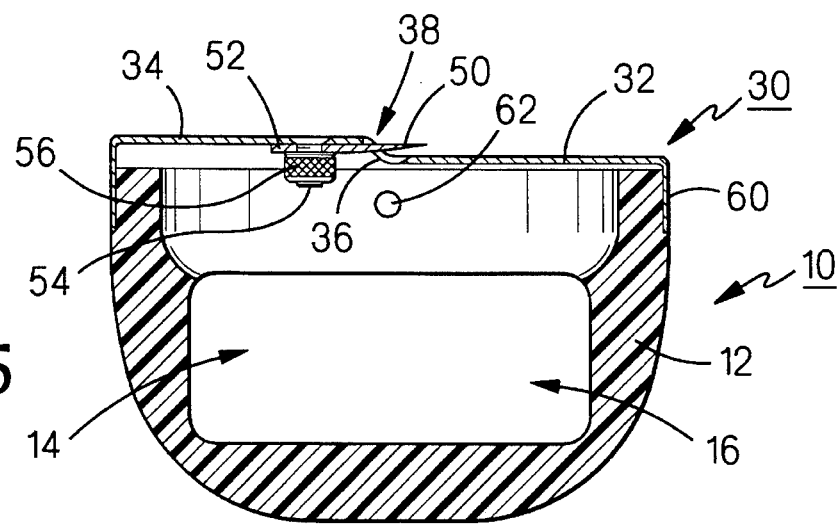
FIG. 5 is a cross-section view of the vegetable/fruit peeler taken along line "5—5" of FIG. 3.

A cover plate 30, generally indicated by the reference numeral 30, covers an open end of body portion 12 and includes a central portion comprising a horizontal lower portion 32 and a horizontal upper portion 34 joined at a step 36 (FIGS. 2, 5). Step 36 includes a slot 38 defined therealong, the slot being dimensioned to accommodate therein a knife edge 50 of a cutting blade 52 (FIGS. 2, 5), with the blade being attached to the lower surface of upper portion 34 by means of two PEM studs 54, the heads of which are flush with the upper surface of upper portion 34, and two knurled nuts 56 (FIGS. 2, 5), for the convenient removal of blade 52 for replacement thereof. Cover plate 30 further includes a cylindrical rim 60 encircling and formed as an orthogonal extension of the peripheral edges of lower and upper portions 32 and 34 for the attachment of the cover plate to body portion 12 by means of two screws 62 (FIGS. 2, 4) inserted through the rim into the body portion.

A lid 70 (FIGS. 1, 2) is dimensioned to frictionally engage cover plate 30 when peeler 10 is not in use, so as to prevent accidental cutting by knife edge 50.

Body portion 12 is preferably formed from polystyrene, while the metallic elements of peeler 10 are preferably formed from stainless steel or other noncorrosive metallic material. Lid 70 may be formed from any suitable polymeric material. All elements of peeler 10 can be economically constructed by conventional manufacturing techniques. The low parts count of peeler 10 affords low manufacturing cost.

Figure 6:
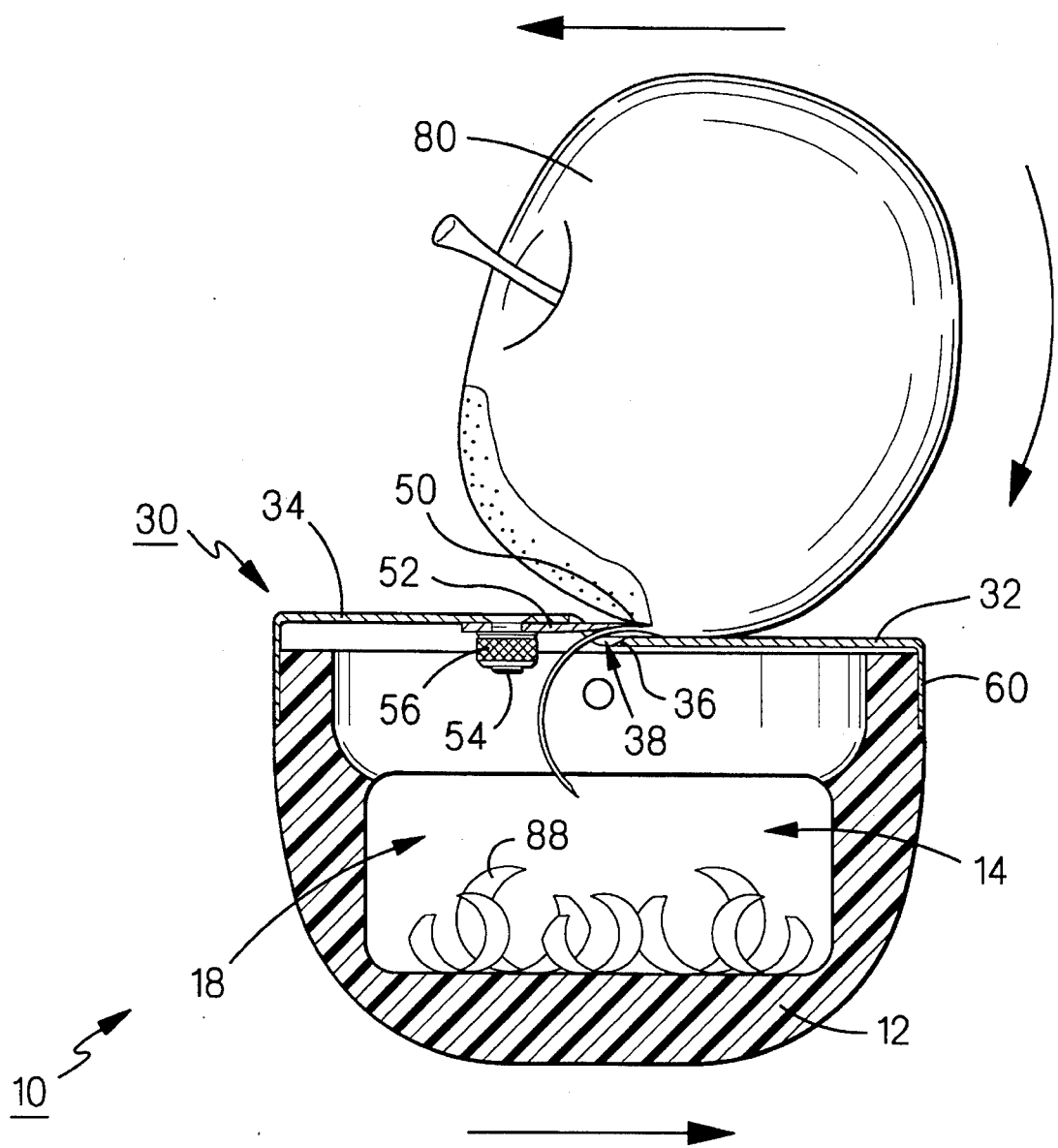
FIG. 6 is a cross-sectional view of the vegetable/fruit peeler in use.

Referring now to FIG. 6, the use of peeler 10 is illustrated. Peeler 10 is shown removing the skin from a piece of fruit 80 which may be assumed to be an apple or other thin skinned vegetable or fruit. Fruit 80 is placed in contact with lower portion 32 of cover plate 30 and, with relative sliding or rolling motion of the fruit and/or peeler 10 as indicated by the arrows, peels, as at 88, accumulate in cavity 14 and are held therein, in part, by the palm of the person using the peeler covering openings 16 and 18. When fruit 80 is completely peeled or when cavity 14 is full, peeler 10 can be held over a receptacle or garbage disposal (neither shown), turned to one side, and peels 88 permitted to fall from the cavity. Alternatively, the peeling operation may take place over the receptacle or garbage disposal and peels 88 permitted to fall from openings 16 and/or 18 as they are created. After use, peeler 10 may be easily and quickly cleaned with a bristle bottle brush and rinsed with a sink spray or put in a dishwasher (none shown).

Step 36, knife edge 50, and blade 52 are so arranged that the knife edge is below the upper surface of upper portion 34 and is closely spaced from the upper surface of lower portion 32 about 0.05 inch. Thus, knife edge 50 is surrounded by a closely spaced, relatively large surface area of lower portion 32, which minimizes the possibility that a person using peeler 10 will be cut while peeling vegetable or fruit 80.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A vegetable/fruit peeler, comprising:

(a) a body portion having a cavity defined therein;

(b) a cover plate closing a portion of said cavity, said cover plate including a central portion comprising a horizontal upper portion and a horizontal lower portion joined at a step, said cover plate including a central portion comprising a horizontal upper portion and a horizontal lower portion joined at a step, said step including a slot defined therealong; and (c) an exposed knife edge extending through said slot, said knife edge being generally parallely spaced closely to and surrounded by a relatively large flat surface of said cover plate;

whereby, when a vegetable or fruit is placed against said relatively large flat surface and against said knife edge, and said knife edge advanced under skin of said vegetable or fruit, said knife edge will remove peels of said skin from said vegetable or fruit which peels will enter said cavity.

2. A vegetable/fruit peeler, as defined in claim 1, wherein said body portion has a substantially hollow, generally hemispheroidal shape defining said cavity and sized so as to be conveniently gripped in a hand of a user.

3. A vegetable/fruit peeler, as defined in claim 1, wherein said body portion includes at least one opening defined through a wall thereof for communication between said cavity and external environment.

4. A vegetable/fruit peeler, as defined in claim 1, wherein said knife edge is a distal edge of a cutting blade attached to a lower surface of said upper portion.

5. A vegetable/fruit peeler, as defined in claim 1, wherein an upper surface of said horizontal lower portion is said relatively large flat surface and said knife edge is generally parallely spaced apart therefrom about 0.05 inch.

6. A method of peeling a vegetable or fruit, comprising:

(a) providing a body portion having a cavity defined therein;

(b) providing a cover plate closing a portion of said cavity, said cover plate including a central portion comprising a horizontal upper portion and a horizontal lower portion joined at a step.,;

(c) providing an exposed knife edge extending through an opening defined in said step, said knife edge being generally parallely spaced closely to and surrounded by a relatively large flat surface of said cover plate;

(d) placing said vegetable or fruit against said relatively large flat surface and against said knife edge and (e) moving said body portion and said vegetable or fruit relative to each other so as to advance said knife edge under skin of said vegetable or fruit, removing peels of said skin from said vegetable or fruit as said peels enter said cavity.

7. A method, as defined in claim 6, further comprising: providing said body portion with a substantially hollow, generally hemispheroidal shape defining said cavity and sized so as to be conveniently gripped in a hand of a user.

8. A method, as defined in claim 6, further comprising: providing said body portion including at least one opening defined through a wall thereof for communication between said cavity and external environment.

9. A method, as defined in claim 6, further comprising: providing said knife edge as a distal edge of a cutting blade attached to a lower surface of said upper portion.

10. A vegetable/fruit peeler, as defined in claim 6, further comprising: providing an upper surface of said horizontal lower portion as said relatively large flat surface and said knife edge generally parallely spaced apart therefrom about 0.05 inch.

\* \* \* \* \*